(12) United States Patent
Nigam

(10) Patent No.: US 6,241,787 B1
(45) Date of Patent: *Jun. 5, 2001

(54) TREATMENT OF SUBSTRATES TO ENHANCE THE QUALITY OF PRINTED IMAGES THEREON WITH A MIXTURE OF A POLYACID AND POLYBASE

(75) Inventor: Asutosh Nigam, Fremont, CA (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,538

(22) Filed: Mar. 31, 1999

Related U.S. Application Data

(60) Provisional application No. 60/082,697, filed on Apr. 22, 1998.

(51) Int. Cl.⁷ .................... D06P 1/38; D06P 1/46; D06P 1/52; D06P 5/30
(52) U.S. Cl. .............. 8/543; 428/195; 427/355; 8/552; 8/597; 8/637.1; 8/445; 8/522; 8/523; 8/506; 8/558
(58) Field of Search ................ 8/549, 552–558, 8/543, 597, 637.1, 594, 445, 522, 523, 506; 427/353; 428/195

(56) References Cited

U.S. PATENT DOCUMENTS

| | | |
|---|---|---|
| 3,996,056 | 12/1976 | Muller . |
| 4,295,931 | 10/1981 | Dumas . |
| 4,333,795 | 6/1982 | Street . |
| 4,371,582 | 2/1983 | Sugiyama et al. . |
| 4,478,682 | 10/1984 | Bankert et al. . |
| 4,645,511 | 2/1987 | Heller et al. . |
| 4,702,742 | * 10/1987 | Iwata et al. . |
| 4,718,918 | 1/1988 | Heller et al. . |
| 4,733,247 | 3/1988 | Arai et al. . |
| 4,764,585 | 8/1988 | Heller et al. . |
| 4,872,951 | 10/1989 | Maliczyszyn et al. . |
| 4,877,680 | 10/1989 | Sakaki et al. . |
| 4,913,705 | 4/1990 | Schlick et al. . |
| 5,223,338 | 6/1993 | Malhotra . |
| 5,277,965 | 1/1994 | Malhotra . |
| 5,279,885 | 1/1994 | Ohmori et al. . |
| 5,478,631 | 12/1995 | Kawano et al. . |
| 5,502,091 | 3/1996 | Dasgupta . |
| 5,515,093 | * 5/1996 | Haruta et al. . |
| 5,525,664 | 6/1996 | Miller et al. . |
| 5,589,277 | 12/1996 | Malhotra . |
| 5,647,898 | 7/1997 | Fuertes et al. . |
| 5,698,478 | 12/1997 | Yamamoto et al. . |
| 5,709,976 | 1/1998 | Malhotra . |
| 5,712,027 | 1/1998 | Ali et al. . |
| 5,798,173 | 8/1998 | Momma et al. . |
| 5,858,514 | * 1/1999 | Bowers . |

FOREIGN PATENT DOCUMENTS

| | | |
|---|---|---|
| 195 05 295 | 9/1995 | (DE) . |
| 19548927 | 7/1996 | (DE) . |
| 0775596 | 5/1997 | (EP) . |

\* cited by examiner

*Primary Examiner*—Margaret Einsmann
(74) *Attorney, Agent, or Firm*—Dianne E. Reed; Reed & Associates

(57) ABSTRACT

The present invention features compositions and methods for improving the quality of images printed on a substrate. The novel image-enhancing compositions contain an image-enhancing agent comprising a mixture of a polyacid and a polybase. When applied to a substrate, the compositions provide for high quality printed images when the treated substrate is printed on with an ink containing a reactive dye having ionizable and/or nucleophilic groups capable of reacting with the image-enhancing agent. Images printed on a substrate treated with the image-enhancing compositions of the invention are bleed-resistant, water-resistant (e.g., water-fast), and/or are characterized by enhanced chroma and hue.

51 Claims, No Drawings

TREATMENT OF SUBSTRATES TO ENHANCE THE QUALITY OF PRINTED IMAGES THEREON WITH A MIXTURE OF A POLYACID AND POLYBASE

CROSS-REFERENCE TO RELATED APPLICATIONS

This application is a continuation-in-part of U.S. provisional patent application No. 60/082,697, filed Apr. 22, 1998, which patent application is incorporated herein by reference.

TECHNICAL FIELD

The present invention relates generally to compositions and methods for the treatment of substrates, and more particularly relates to compositions and methods for treating substrates to enhance the quality of images printed thereon. The invention is useful in the treatment of a wide variety of substrate types, including flexible and rigid substrates, porous and nonporous substrates, cellulosic and noncellulosic substrates, and the like.

BACKGROUND

As printing technology advances, manufacturers of many different types of products are faced with the increasingly rigorous demands of their customers for high quality printed images on those products. Such products include, for example, printed paper, printed polymeric sheets, coatings or films, printed metallic items, and the like.

For example, there is a keen demand for paper that can be printed on to provide images of exceptionally high quality, particularly with respect to brightness, clarity, opacity, water-fastness, water resistance, bleed resistance and rub resistance. The customer further demands that paper be amenable to use with a variety of printing techniques, including not only conventional printing techniques, but also "impact-free" printing techniques such as inkjet printing (particularly colored inkjet printing), laser printing, photocopying, and the like.

In response, paper manufacturers have attempted to meet their customers' demands for such high quality paper through a process termed "sizing." "Sizing," which encompasses both "internal sizing" and "external sizing," affects the manner in which colorants and particularly ink interact with the fibers of the paper. "Internal sizing" involves introduction of sizing compositions within the entire fibrous mass at the pulp stage of paper manufacturing (i.e., to the wet pulp, or more specifically, to the prepared papermaking furnish) before the stock is formed into a sheet, resulting in the distribution of the sizing composition within the entire fibrous mass that is subsequently used to produce the flat fibrous paper sheet. "External sizing" (also referred to as surface application, pasting, saturating or coating) involves application of a sizing composition to at least one surface of a fibrous paper sheet, so that the composition is present on or in at least one of the two faces of the fibrous sheet. Various materials have been used as sizing agents, such as conventional and modified starches, polyvinyl alcohol, cellulosic derivatives, gelatin, rosin, proteins such as casein, natural gums and synthetic polymers. Although these materials are effective to various degrees under certain conditions, use of each is associated with certain limitations. For example, it is often necessary to use large amounts of these conventional sizing agents in order to provide paper having the desired properties. However, the opacity and brightness of the paper substrate decrease in direct proportion to the amount of sizing agent applied to the paper. Moreover, as the amount of sizing agent and/or the cost of the sizing agent increases, the cost of producing the paper increases, making high quality papers prohibitively expensive. Certain sizing agents impart relatively poor bleed resistance and water resistance of imprinted inks, and thus must be used with insolubilizing agents to ensure production of a printed paper having satisfactory water resistance.

Use of conventional sizing agents also results in a decrease in the porosity of the final paper substrate; thus, while the sized paper substrate may have the desired brightness and opacity, it may not provide for a printed image having a suitable optical density or color intensity. In addition, as the porosity of the paper increases, the paper becomes less amenable to various handling processes during manufacturing. For example, envelope manufacturers demand that the paper available to them have a relatively low porosity. If the porosity of the paper is too high, the paper is too stiff for handling by automated industrial devices for folding and sorting (e.g., devices of the "suction extractor" type) during envelope production. In contrast to lower porosity papers, high porosity papers also require slower machine speeds, and further require refining and draining operations that have relatively high energy costs.

Coatings have additionally been used to enhance the quality of printed images on paper, albeit with limited success. Regarding other types of substrates, a variety of coating methods and compositions have also been suggested. However, as with paper, there is not at this time any satisfactory method for improving the quality of images printed on polymeric films, metallic sheets, or the like using water-based inks.

The present invention is directed to the aforementioned need in the art, and provides an efficient, versatile and cost-effective means for treating substrates that can then be printed on to yield high quality, water-resistant printed images. The compositions and methods of the invention are amenable for use with a wide variety of substrate types, and are compatible with conventional manufacturing and post-manufacturing handling processes.

SUMMARY OF THE INVENTION

The present invention features novel image-enhancing compositions for treating a substrate to enhance the quality of images printed thereon, wherein the image-enhancing compositions are composed of an image-enhancing agent comprised of a mixture of a polyacid and a polybase. Substrates can be treated during or after manufacture. Substrates treated with the present image-enhancing compositions can be printed on to yield high quality printed images, particularly when printed on with an ink containing a reactive dye having ionizable and/or nucleophilic groups capable of reacting with the image-enhancing agent. The printed images are bleed-resistant, rub-resistant, water-resistant (e.g., water-fast), and/or are characterized by an enhanced chroma and hue.

It is a primary object of the invention to address the above-mentioned need in the art by providing such an image-enhancing composition that efficiently binds colorant upon printing.

Another object of the invention is to provide a treated substrate that can be printed on to yield an image that is high quality (particularly with respect to optical density and brightness), and that is bleed-resistant, rub-resistant, and water-resistant (e.g., water-fast).

Still another object of the invention is provide a method for treating substrates using the image-enhancing compositions of the invention.

Still an additional object of the invention is to provide a method for printing on a substrate to provide water-resistant (e.g., water-fast) printed images thereon.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

Definitions and Nomenclature

It must be noted that, as used in the specification and the appended claims, the singular forms "a," "an" and "the" include plural referents unless the context clearly dictates otherwise. Thus, for example, reference to "an image-enhancing agent" in a composition means that more than one image-enhancing agent can be present in the composition, reference to "a polyacid" includes mixtures of polyacids, reference to "a polybase" includes mixtures of polybases, and the like.

"Aqueous based ink" refers to an ink composed of an aqueous carrier medium and a colorant, such as a dye or a pigment dispersion. An aqueous carrier medium is composed of water or a mixture of water and one or more water-soluble organic solvents. Exemplary aqueous based ink compositions are described in detail below.

"Colorant" as used herein is meant to encompass dyes, pigments, stains, and the like compatible for use with the image-enhancing compositions of the invention.

The term "colorant-reactive component" as used herein refers to a component (e.g., a chemical moiety) of an image-enhancing agent that is capable of reacting with a selected colorant, particularly a colorant having a nucleophilic and/or ionizable group, to form an image-enhancing agent-colorant complex. The image-enhancing agent-colorant complex is formed through either a covalent, electrostatic, or ionic association between the colorant-reactive component of the image-enhancing agent and the colorant. When an image-enhancing agent having a colorant-reactive component and a selected colorant from an image enhancing agent-colorant complex in the context of a printed image on a substrate, the association between the colorant and the color-reactive component of the image-enhancing agent is effective to impart advantageous qualities to the printed image on the substrate, particularly with respect to water resistance, enhanced optical density, enhanced brightness, and the like.

The term "treating," as used herein to refer to the application of an image-enhancing composition of the invention to a substrate, is intended to include both application of a coating to a substrate surface as well as partial or complete saturation of a substrate with the composition.

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids.

The term "significant", as when used with reference to "significantly enhanced brightness" or "significantly improved water-fastness" generally refers to a difference in a quantifiable, measurable, or otherwise detectable parameter, e.g., optical density, LAB graphs (color sphere), dot spread, bleed through, between the two groups being compared (e.g., untreated versus treated substrates) that is statistically significant using standard statistical tests. For example, the degree of visual wicking or water-fastness of a printed substrate as detected in a print assay may be quantified using standard methods, and the degree of wicking or water-fastness under different conditions can be compared for both treated and untreated substrates to detect statistically significant differences.

The term "fluid resistance" is used herein to describe the resistance of a printed substrate to penetration by a fluid, with the term "water resistance" specifically referring to resistance of a substrate to penetration by water.

The term "water-fast," is used herein to describe a form of water resistance, and which is normally used to refer to the nature of the ink composition after drying on a substrate. In general, "water-fast" means that the dried composition is substantially insoluble in water, such that upon contact with water, the dried ink retains at least about 70%, preferably at least about 85%, and more preferably at least about 95%, of optical density.

The term "bleed resistance" is meant to refer to the retardation of the penetration of water into a substrate, which retardation is associated with creation of a low energy hydrophobic surface at the fiber-water interface which increases the contact angle formed between a drop of liquid and the surface, and thus decreases the wettability. Contact angles have been shown to be sensitive to molecular packing, surface morphology, and chemical constitution of the substrate and any components added thereto.

The term "rub resistance" is normally meant to refer to a characteristic of the ink composition after drying on a substrate, more specifically, the ability of a printed image to remain associated with the substrate upon which it is printed despite application of force (e.g., rubbing) to the printed image. In general, "rub resistant" means that the dried ink composition is substantially resistant to rubbing force so that the dried ink retains at least about 70%, preferably at least about 85%, and more preferably at least about 95%, of optical density after rubbing of the printed image.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkylene" as used herein refers to a difunctional, branched or unbranched saturated hydrocarbon group of 1 to 24 carbon atoms, including without limitation methylene, ethylene, ethane-1,1-diyl, propane-2,2-diyl, propane-1,3-diyl, butane-1,3-diyl, and the like. "Lower alkylene" refers to an alkylene group of 1 to 6 carbon atoms.

The term "alkenyl" as used herein refers to a branched or unbranched hydrocarbon group of 2 to 24 carbon atoms containing at least one carbon-carbon double bond, such as ethenyl, n-propenyl, isopropenyl, n-butenyl, isobutenyl, t-butenyl, octenyl, decenyl, tetradecenyl, hexadecenyl, eicosenyl, tetracosenyl and the like. Preferred alkenyl groups herein contain 2 to 12 carbon atoms and 2 to 3 carbon-carbon double bonds. The term "lower alkenyl" intends an alkenyl group of 2 to 6 carbon atoms, preferably 2 to 4 carbon atoms, containing one —C=C— bond. The term "cycloalkenyl" intends a cyclic alkenyl group of 3 to 8, preferably 5 or 6, carbon atoms.

The term "alkenylene" refers to a difunctional branched or unbranched hydrocarbon chain containing from 2 to 24 carbon atoms and at least one carbon-carbon double bond. "Lower alkenylene" refers to an alkenylene group of 2 to 6, more preferably 2 to 5, carbon atoms, containing one —C=C— bond.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing 1 to 6 carbon atoms.

The term "aryl" as used herein refers to an aromatic species containing 1 to 3 aromatic rings, either fused or linked, and either unsubstituted or substituted with 1 or more substituents typically selected from the group consisting of lower alkyl, halogen, —$NH_2$ and —$NO_2$. Preferred aryl substituents contain 1 aromatic ring or 2 fused or linked aromatic rings.

"Halo" or "halogen" refers to fluoro, chloro, bromo or iodo, and usually relates to halo substitution for a hydrogen atom in an organic compound.

The prefix "poly-" as in "polyacid" or "polybase" is intended to mean that the compound so designated has two or more acidic groups or two or more basic groups, respectively. Thus, the term "polyacid" herein encompasses a diacid, and the term "polybase" herein encompasses a dibase.

The term "polymer" is used herein in its conventional sense to refer to a compound having two or more monomer units, and is intended to include homopolymers as well as copolymers. The term "monomer" is used herein to refer to compounds which are not polymeric.

"Optionally" or "optionally" means that the subsequently described event or circumstance may or may not occur, and that the description includes instances where said event or circumstance occurs and instances where it does not. For example, the phrase "optionally substituted" aromatic ring means that the aromatic ring may or may not be substituted and that the description includes both an unsubstituted aromatic ring and an aromatic ring bearing one or more substituents.

Overview of the Invention

The present invention is based upon the discovery that a composition containing an image-enhancing agent comprising a mixture of a polyacid and a polybase is effective in treating a wide variety of substrates to significantly improve the quality of images printed thereon. Substrates that have been treated with an image-enhancing composition of the invention can be printed on to yield high quality printed images having improved color fastness (the printed images do not run when exposed to moisture) as a result of the substantially non-reversible binding of aqueous colorants to the image-enhancing agent present in the image-enhancing composition. Substrates that are treated with the compositions of the invention and then printed on thus provide images that can be characterized as "water-resistant" or "water-fast" due to the characteristics of the printed image following exposure to water. The printed images are also bleed-resistant as well as rub-resistant.

The treated substrates of the invention can be used in conventional printing, or with digital printing (particularly inkjet printing, including drop-on-demand and continuous printing) to provide highly brilliant, printed images that are significantly improved in color quality (for example, with respect to chroma and hue) when compared to untreated substrates or conventionally treated substrates. The present compositions and their methods of use according to the present invention thus provide a number of advantages over conventional textile treatment compositions, paper coating and sizing compositions, and the like.

The image-enhancing compositions, methods of treatment using the image-enhancing compositions described herein, and other features of the invention are described in greater detail below.

Image-Enhancing Compositions

The image-enhancing compositions of the invention are composed of an image-enhancing agent comprising a mixture of a polyacid and a polybase. In general, the image-enhancing agents have a colorant-reactive component that is capable of reacting with a selected colorant, particularly a colorant having a nucleophilic and/or ionizable group, to form an image-enhancing agent-colorant complex through a covalent, electrostatic, or ionic association. The association of the image-enhancing agent and colorant imparts water resistance (e.g. water-fastness), and other desirable characteristics to the printed image on the substrate surface. In addition to the image-enhancing agent, the image-enhancing compositions can include components such as film-forming binders, pigments, and other additives.

The image-enhancing compositions of the invention can be readily prepared from commercially available starting materials and/or reagents, are compatible with additional binders or additives, can be used with a variety of substrates, are compatible with a variety of printing methods, including conventional and digital printing methods (particularly inkjet printing, including drop-on-demand printing and continuous printing), and can also be used with existing commercial manufacturing methods and equipment, including, for example, textile and paper production processes and equipment. The image-enhancing composition is inexpensive to prepare, and relatively small amounts are required to provide a treated substrate having the advantageous features described herein. The image-enhancing compositions of the invention are also easy to handle due to their solubility in water (the active components, the image-enhancing agents, are hydrophilic polymers), and do not require the use of large volumes of organic solvents. The novel image-enhancing compositions herein also possess good film-forming properties.

The treated substrates prepared using the compositions of the invention react rapidly with a number of aqueous based colorants. Furthermore, because colorants react quickly with the image-enhancing agent in the present compositions, the printed-on, treated substrate does not require a separate curing step, but rather is fast-drying. This fast-drying characteristic provides for printed images that are "non-sticky," thus allowing the printed substrate to be handled immediately after printing. In addition to their water resistance, substrates treated with an image-enhancing composition of the invention are highly bleed-resistant (as evidenced by small dot size measurements, i.e., less wicking action) and rub-resistant.

The various components of the image-enhancing composition will now be described.

1. Image-Enhancing Agents

Image-enhancing agents in the image-enhancing compositions of the invention generally comprise a mixture of a polyacid and a polybase, wherein the polyacid and polybase may be either monomeric or polymeric. That is, the image-enhancing agent may be composed of any suitable combination of: 1) a monomeric polyacid and a monomeric polybase; 2) a polymeric polyacid and a polymeric polybase; 3) a polymeric polyacid and a monomeric polybase; and/or 4) a monomeric polyacid and a polymeric polybase. The selection of these combinations for use as the image-enhancing agent in the present compositions will vary according to a variety of factors such as the nature of the substrate to be treated, the colorant to be used in printing on the treated substrate, etc. The relative ratios of the polyacid and polybase within the mixture will also vary according such factors, but typically the ratio of base to acid is in the range of approximately 1:1 to 10:1, more typically in the range of approximately 1:1 to 3:1. The image-enhancing agent typically represents approximately 5% to 95% of the image-enhancing composition, preferably approximately 10% to 95% of the image-enhancing composition, based upon total solids weight of the composition after drying.

In general, the pH of the image-enhancing composition having a polyacid/polybase image-enhancing agent is neutral or basic, preferably at least about pH 7 or higher. The pH is maintained by the addition of appropriate bases such ammonia, primary, secondary, and tertiary alkyl amines, ethanolamines, diamine, and the like.

In general, monomeric polyacids will contain two or more carboxylic, sulfonic and/or phosphonic acid groups. Exemplary monomeric polyacids have the structural formula (I)

$$[R—(L_x—COOH)_y]_z \quad (I)$$

wherein: R is selected from the group consisting of alkyl, alkenyl, aryl of 1 to 3 rings which may be fused or linked, and 5- and 6-membered heterocyclic rings having from 1 to 3 heteroatoms selected from N, S and O; L is an alkylene or alkenylene chain containing 1 to 8 carbon atoms; x is 0 or 1; y is an integer in the range of 2 to 10 inclusive; and z is 1, 2 or 3, with the proviso that if z is 2 or 3, the distinct R groups are covalently linked to each other.

Specific examples of preferred monomeric polyacids include, but are not necessarily limited to, oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxy-terephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof In general, monomeric polybases useful herein contain two or more primary, secondary or tertiary amino groups. Exemplary monomeric polybases have the structural formula (II)

$$[R—(L_x—NR^5R^6)_y]_z \quad (II)$$

wherein $R^5$ and $R^6$ are hydrogen, alkyl, alkoxy, or hydroxyl-substituted alkoxy, and R, L, x, y and z are as defined with respect to the monomeric polyacid.

Specific examples of monomeric polybases include, but are not limited to, ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

The polymeric polyacids contain carboxylic, sulfonic and/or phosphonic acid groups, but most preferably contain carboxylic acid groups. Examples of polymeric polyacids include, without limitation, poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(methacrylate-acrylic acid), poly(methyl methacrylate-acrylic acid), poly(methyl methacrylate-styrene-acrylic acid), poly(vinyl pyrrolidone-acrylic acid), poly(styrene-co-maleic acid), poly(methyl methacrylate-styrene-co-maleic), poly(ethylene-propylene-acrylic acid), poly(propylene-acrylic acid), alginic acid, phytic acid, and combinations thereof.

The polymeric polybases comprise nitrogenous polymers that may have pendant primary, secondary or tertiary amine groups and/or nitrogenous moieties in the backbone, i.e., —NH— or —NRx groups. Exemplary polymeric polybases include, but are not limited to, polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

2. Film-Forming Binders

The image-enhancing compositions of the invention preferably include a film-forming binder. By "film-forming binder" is meant a substance that provides for improved strength of a substrate upon application of the substance to the substrate. "Film-forming binders" used in connection with the image-enhancing compositions of the invention include any film-forming binder that is compatible with the selected image-enhancing agent and other components of the image-enhancing composition. Exemplary film-forming binders include, but are not necessarily limited to: polysaccharides and derivatives thereof, e.g., starches, cellulosic polymers, dextran and the like; polypeptides (e.g., collagen and gelatin); and synthetic polymers, particularly synthetic vinyl polymers such as poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinyl amine), synthetic acrylate polymers and copolymers such as poly(acrylic acid-co-methacrylate), poly(vinyl-co-acrylate), and the like, and water-soluble or water-dispersible polyesters such as sulfopolyesters (e.g., as available from Eastek).

Polysaccharide binders: Starches, as noted above, represent one category of suitable film-forming binders for use herein. Suitable starches may be any of a variety of natural, converted, and synthetically modified starches. Exemplary starches include, but are not necessarily limited to, starch (e.g., SLS-280 (St. Lawrence Starch)), cationic starches (e.g., Cato-72 (National Starch), hydroxyalkylstarch, wherein the alkyl has at least one carbon atom and wherein the number of carbon atoms is such that the material is water soluble, preferably from about 1 to about 10 carbon atoms, such as methyl, ethyl, propyl, butyl, or the like (e.g., hydroxypropyl starch #02382 (PolySciences, Inc.), hydroxyethyl starch #06733 (PolySciences, Inc.), Penford Gum 270 and 280 (Penford), and Film-Kote (National Starch)), starch blends (see, e.g., U.S. Pat. No. 4,872,951, describing a blend of cationic starch and starch treated with an alkyl or alkenyl succinic anhydride (ASA), preferably 1-octenyl succinic anhydride (OSA)), and the like. The film-forming binder can also be a synthetically produced polysaccharide, such as a cationic polysaccharide esterified by a dicarboxylic acid anhydride (see, e.g., U.S. Pat. No. 5,647,898). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like). Still additional film-forming binders of this type include dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), and gelatin.

Additional exemplary film-forming binders include resins (e.g., such as formaldehyde resins such as melamine-formaldehyde resin, urea-formaldehyde resin, alkylated urea-formaldehyde resin, and the like ionic polymers (e.g., poly(2-acrylamide-2-methyl propane sulfonic acid, poly(N,N-dimethyl-3,5-dimethylene piperidinium chloride, poly (methylene-guanidine), and the like), maleic anhydride and maleic acid-containing polymers (e.g., styrene-maleic anhydride copolymers, vinyl alkyl ether-maleic anhydride copolymers, alkylene-maleic anhydride copolymers, butadiene-maleic acid copolymers, vinylalkylether-maleic acid copolymers, alkyl vinyl ether-maleic acid esters, and the like), acrylamide-containing polymers (e.g., poly (acrylamide), acrylamide-acrylic acid copolymers, poly(N, N-dimethyl aaylamide), and the like), poly(alkylene imine)-containing polymers (e.g., poly(ethylene imine), poly (ethylene imine) epichlorohydrin, alkoxylated poly(ethylene imine), and the like), polyoxyalkylene polymers (e.g., poly (oxymethylene), poly(oxyethylene), poly(ethylene oxide), ethylene oxide/propylene oxide copolymers, ethylene oxide/ 2-hydroxyethyl methacrylatelethylene oxide and ethylene oxide/hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like), etc.

Any of the above exemplary film-forming binders can be used in any effective relative amounts, although typically the film-forming binder, if present, represents approximately 1 wt. % 40 wt. %, preferably 1 wt. % to 25 wt. %, most preferably 1 wt. % to 15 wt. % of the present image-enhancing composition, after drying on a substrate. Starches and latexes are of particular interest because of their availability and applicability to a variety of substrates.

3. Other Components of the Image-Enhancing Composition

Additional components of the image-enhancing composition may include, but are not necessarily limited to, inorganic fillers, anti-curl agents, surfactants, plasticizers, humectants, UV absorbers, light fastness enhancers, polymeric dispersants, dye mordants, optical brighteners, and leveling agents, as are commonly known in the art. Illustrative examples of such additives are provided in U.S. Pat. Nos. 5,279,885 and 5,537,137. The image-enhancing compositions may also include a crosslinking agent such as zirconium acetate, ammonium zirconium carbonate, or the like, for intramolecular and/or intermolecular crosslinking of image-enhancing agent, and/or a chelating agent such as boric acid. Of particular interest with respect to the treatment of paper substrate are components that provide for a coated substrate having a non-glossy, matte, or glossy surface; as will be appreciated by those skilled in the art, incorporation of a pigment (e.g., silica, calcium carbonate) will generally give rise to a non-glossy surface, while a glossy surface will result in the absence of a pigment (or in the presence of only a small amount of pigment).

The image-enhancing composition may also contain a colorant, e.g., a pigment, dye, or other colorant, to provide for whiteness or color of the substrate; this is particularly true for use in sizing or coating paper. Additional components that may be desirable to include in the compositions of the invention, particularly when the compositions are to be used to treat paper, are found in *PAPER CHEMISTRY, 2$^{nd}$ Edition*, Roberts, ed., Blackie Academic & Professional, Glasgow, UK (1994). The aforementioned reference also provides guidance for the use of such components and a general description of paper chemistry.

The image-enhancing composition of the invention is preferably provided in an aqueous liquid vehicle, although small amounts of a water-soluble organic solvent may be present. The aqueous liquid vehicle will generally be water, although other nonorganic compounds which are either water soluble or water miscible may be included as well. It may on occasion be necessary to add a solubilizing compound during preparation of the image-enhancing composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 20 wt. % of the composition, and in most cases will represent not more than about 10 wt. % of the composition.

Substrates and Treatment Thereof

The compositions and methods of the invention are generally applicable to a wide variety of substrates to improve the quality of images printed on the substrate surface. The substrates may be flexible or rigid, porous or nonporous, and cellulosic or noncellulosic. Suitable substrates with which the present compositions and methods can be used include, but are not limited to, paper, polymeric films, metallic sheets, and the like.

1. Treatment of Paper

The image-enhancing compositions of the invention can be used to treat a paper substrate, for example in a coating or sizing process. The term "paper" is meant to encompass a substrate based on cellulosic fibers; synthetic fibers such as polyamides, polyesters, polyethylene, and polyacrylic fibers; inorganic fibers such as asbestos, ceramic, and glass fibers; and any combination of cellulosic, synthetic, and inorganic fibers. Paper substrates that can be treated using the compositions of the invention may be of any dimension (e.g., size or thickness) or form (e.g., pulp, wet paper, dry paper, etc.). The paper may or may not have been sized prior to treatment according to the methods of the invention; that is, the present compositions can be applied to paper having either a pretreated surface or a surface that has not been treated or coated. The paper substrate is preferably in the form of a flat or sheet structure, which structure may be of variable dimensions. "Paper" is meant to encompass printing paper (e.g., inkjet printing paper, etc.), writing paper, drawing paper, and the like, as well as board materials such as cardboard, poster board, Bristol board, and the like.

(A) Paper Coating

The image-enhancing composition may be applied as a coating on sized paper either as a pretreatment (i.e., prior to printing), simultaneously with printing, or as an after-treatment. As a paper coating, the compositions of the invention are applied to sized paper in quantities suitable to provide the desired characteristics of an image printed on the paper surface, including bleed resistance, water resistance (e.g., water-fastness), etc. Typical amounts of image-enhancing composition to be applied as a top coating, on sized paper, generally range from about fifty to about five hundred pounds per ton of paper substrate. Processes for coating pre-sized paper substrates are well known in the art, and can be performed either on-machine, as part of the initial paper manufacturing process, or off-machine, subsequent to completion of paper manufacture. Generally, coating is accomplished by dip coating, reverse roll coating, extrusion coating, saturation, and the like. However, where the image-enhancing composition is applied as a coating on-machine, in order to achieve acceptable manufacture speeds of about 100 to 3000 ft./per minute, it is recommended that the weight of the sized paper base be greater than 30 grams per square meter. When the final product is to exhibit gloss at a satisfactory level (generally, greater than 50), the base sheet, before it receives the coating, should retard rapid drainage of the water or of the coating into the fibrous substrate.

Additional information concerning the coating of sized paper with compositions and methods such as those described herein may be found in U.S. patent application Ser. No. 09/282,754, entitled "Method and Composition for Coating Pre-Sized Paper" (Nigam et al.), filed on even date herewith.

(B) Paper Sizing

The image-enhancing compositions of the invention can also be used to treat paper that has not been sized; in this embodiment, then, the compositions represent paper "sizing" compositions. The present image-enhancing compositions can be used in either an internal sizing process or in an external sizing process, although use in external sizing is preferred. "Internal sizing" involves introduction of a sizing composition at the pulp stage of paper manufacturing, resulting in the distribution of the composition within the fibrous mass subsequently used to produce a fibrous paper sheet. "External sizing" involves application of a sizing composition to a surface of a paper sheet, so that the sizing composition is present on or in at least one of the two faces of the paper. External sizing also saturates the paper to various extents depending on the degree of internal sizing.

Exemplary external sizing techniques include, but are not necessarily limited, to, size press treatment, dip coating, reverse roll coating, extrusion coating, and the like. For example, the sizing composition can be applied with a size press by dip coating and can be applied by solvent extrusion. The size press can be a sheet-fed size press or a size press employing a continuous web, preferably a continuous web size press. Generally, in a sizing process, the image-enhancing compositions of the invention are applied in amounts ranging from about 10 to 500, preferably 30 to 500, pounds per ton of substrate.

Additional information concerning sizing paper with compositions and methods such as those described herein may be found in U.S. Pat. No. 6,171,444 entitled "Method and Composition for the Sizing of Paper Using a Mixture of a Polyacid and a Polybase" (Nigam et al.), filed on even date herewith.

2. Other Substrates

Other substrates that may be treated with the image-enhancing composition of the invention include, but are not limited to: polymeric substrates such as films, sheets, coatings, and solid blocks, comprised of, for example, polyesters (including "MYLAR" flexible film), vinyl polymers, polysulfones, polyurethanes, polyacrylates, polyimides, and the like; metallic substrates such as films, sheets, coatings, foils, and solid blocks, comprised of, for example, aluminum, brass, copper, or the like; inorganic substrates, particularly films, sheets, coatings, and solid blocks, comprised, of, for example, glass, metal oxides, silicon-containing ceramics, and the like; laminates such as a paper/polymeric film or paper/metal foil laminate; textiles comprised of natural or synthetic fibers; and leather. It should be emphasized that the nature of the substrate is not critical; rather, it is the image-enhancing treatment of the invention that is key, as any substrate treated with the image-enhancing composition of the invention can be printed on to yield a high quality printed image.

Method for Providing Water-Resistant Images on Treated Substrates

The invention also features a method for providing a water-resistant (e.g., water-fast) printed image on a substrate surface by first applying to the substrate surface an image-enhancing composition of the invention and then applying a colorant to the treated substrate, where the colorant contains reactive ionizable and/or nucleophilic groups capable of reacting with the image-enhancing agent in the image-enhancing composition.

In general, aqueous inks are used in the preparation of a printed image on the treated substrates of the invention. The aqueous ink may be any suitable ink having a colorant, e.g., a pigment, dye, or stain, having one or more reactive groups suitable for reacting, either covalently or ionically, with a colorant-reactive component of the image-enhancing agent present on the treated substrate. The selection of the specific ink and colorant will vary with the colorant-reactive component of the image-enhancing agent. Thus, preferred colorants for use in printing on a substrate treated with the present image-enhancing compositions are those containing one or more ionizable or nucleophilic moieties, e.g., having an amino, carboxy, sulfonato, thiosulfonato, cyano, hydroxy, halo, phosphonato or sulfido group, or the like.

The inks used in conjunction with the treated substrates of the invention may be inkjet inks. Water-soluble colorants in the inkjet inks may be acid dyes, direct dyes, basic dyes or dispersive dyes; preferred dyes are described in U.S. Pat. Nos. 5,425,805, 5,537,137, and 5,441,561.

The selection of the aqueous based ink will depend upon the requirements of the specific application, such as desired surface tension, viscosity, drying time, the type of substrate upon which the ink is to be applied (printing medium), and the like. The aqueous liquid vehicle of inks suitable for use in the invention will generally be water, although other nonorganic compounds which are either water soluble or water miscible may be included as well. The colorant may be dissolved, dispersed or suspended in the aqueous liquid vehicle, and is present in an amount effective to provide the dried ink with the desired color and color intensity.

In some instances, the dye is contained in a carrier medium composed of ink and a water soluble organic solvent. For applications utilizing such a carrier medium, representative solvents include polyols such as polyethylene alcohol, diethylene glycol, propylene glycol, and the like. Additional solvents are simple alcohols such as ethanol, isopropanol and benzyl alcohol, and glycol ethers, e.g., ethylene glycol monomethyl ether, diethylene glycol monoethyl ether. Representative examples of water soluble organic solvents are described in U.S. Pat. Nos. 5,085,698 and 5,441,561.

Preferred colorants contained in the inks useful with the invention are dyes, including azo or "direct" dyes as well as dyes containing acidic groups (e.g., carboxylate, phosphonate or sulfonate moieties), basic groups (e.g., unsubstituted amines or amines substituted with 1 or 2 alkyl, typically lower alkyl, groups), or both. Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, Inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR-N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.).

Printed Substrates

The invention also features a printed substrate produced using the methods and compositions described herein. The printed, treated substrate of the invention can be produced by any of a variety of printing techniques, including inkjet printing, laserjet printing, photocopying, and the like. In general, the printing process involves applying, in an imagewise pattern, an aqueous recording liquid to a substrate that has been treated with an image-enhancing composition of the invention. Inkjet printing processes are well known in the art; see, for example, U.S. Pat. Nos. 4,601,777; 4,251,824; 4,410,899; 4,412,224; and 4,532,530.

Some substrates treated with the image-enhancing compositions of the invention, particularly paper substrates, can also be printed on using printing and/or copying processes that require dry or liquid electrophotographic-type developers, such as electrophotographic processes, ionographic process, and the like. The treated substrates of the invention can also be printed on using a process for generating images that involves generating an electrostatic latent image on an imaging member in an imaging apparatus, developing the latent image with a toner, and transferring the developed image to a treated substrate of the invention. Electrophotographic processes are known in the art, see, e.g., U.S. Pat. No. 2,297,691. Ionographic and electrographic processes are also well known in the art; see, e.g., U.S. Pat. Nos. 3,611,419; 3,564,556; 4,240,084; 4,569,584; 2,919,171; 4,524,371; 4,619,515; 4,463,363; 4,254,424; 4,538,163; 4,409,604; 4,408,214; 4,365,549; 4,267,556; 4,160,257; and 4,155,093.

The treated substrates of the invention can also be printed on using a variety of other printing and imaging processes, such as offset printing, printing with pen plotters, handwriting with ink pens, and the like.

EXPERIMENTAL

The following examples are put forth so as to provide those of ordinary skill in the art with a complete disclosure and description of how to prepare and use the compounds disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric.

Also, in these examples, unless otherwise stated, the abbreviations and terms employed have their generally accepted meanings. Abbreviations and tradenames are as follows (note that suppliers of each material are indicated as well):

AR74=vinyl acetate/acrylic copolymer, 45% aqueous solution (Rohm & Haas);
Boric Acid=boric acid/ammonium hydroxide solution (Aldrich);
Carboset=polyacrylic acid (Carboset GA 1594, B. F. Goodrich);
Eastek=Eastek 1100 polymer (Eastman);
EPEI=ethoxylated polyethylene imine (37%, Aldrich);
Gum 280=starch (Penford Gum 280, Penford);
Jetcoat 20=25% calcium carbonate in water (Specialty Minerals);
Sif=fumed silica (Aerosil MOX 170, Air Products);
Sip=precipitated silica (FK310, Degussa);
SMA=styrene-maleic anhydride copolymer (Georgia Pacific);
Tinopal=brightener (Ciba Additives);
Unicrepe=adipic acid-diethylenetriamine copolymer (Georgia Pacific).

All patents, patent applications, journal articles and other references mentioned herein are incorporated by reference in their entireties.

EXAMPLE 1

Image-Enhancing Compositions

The following table summarizes exemplary image-enhancing compositions based on the polyacid/polybase systems of the invention (Tables 1 through 5).

TABLE 1

| Formulation No. | Resin 1 (SMA) | Resin 2 | EPEI | Binder (AR74) | Boric Acid in NH₄OH | Pigment (1:4Sif:Sip) | Solids (%) |
|---|---|---|---|---|---|---|---|
| 5-2 | 21.4 | | 7.1 | | | 71.4 | 12.7 |
| 4-1 | 30.5 | | 10.2 | 8.4 | | 50.9 | 17.9 |
| 6-1 | 40.6 | | 40 | 8.6 | 10.1 | | 2.4 |
| 2-4 | 62.5 | | 20.8 | 16.7 | | | 8.6 |
| 2-3 | 65.9 | | 22 | | 12.1 | | 8.2 |
| 2-2 | 50 | Carboset, 16.7 | 16.7 | | | | 9.5 |
| 4-2 | 30 | Carboset, 10.0 | 10 | | | 50 | 18.2 |
| 7-1 | 23.8 | Unicrepe, 71.4 | | 4.8 | | | 8.4 |
| 9-1 | 23.8 | Unicrepe, 71.4 | | 4.8 | | | 4.2 |
| 9-2 | 21.3 | Unicrepe, 63.8 | | 4.3 | 10.6 | | 4.6 |
| 8-1 | 42.4 | Unicrepe, 42.4 | 15.2 | | | | 8.2 |
| 8-2 | 39.1 | Unicrepe, 39.1 | 14 | 7.8 | | | 8.8 |
| 8-3 | 39.1 | Unicrepe, 39.1 | 14 | 7.8 | | | 4.4 |
| 8-4 | 36.1 | Unicrepe, 36.1 | 12.9 | 7.2 | 7.2 | | 4.7 |

TABLE 2

| Formulation No. | Starch (Gum 280) | Resin 1 (SMA) | Resin 2 (Unicrepe) | Binder (PVOH) | Eastek (1100) Polymer | Pigment 1:4 Sif:Sip | Solids (%) | Tinopal | pH |
|---|---|---|---|---|---|---|---|---|---|
| 70-1 | 22 | 1.6 | 34.4 | 9.4 | | 32.7 | 20.6 | | 8.38 |
| 70-3 | 22 | 1.6 | 34 | 9.4 | | 32.8 | 25.7 | | 7.32 |
| 70-2 | 22 | 1.6 | 34.4 | | 9.4 | 32.7 | 25.1 | | 8.46 |
| 72-1 | 35 | 1.5 | 21.5 | | 10.0 | 32.0 | 20.5 | | 9.20 |
| 71-3 | 30.5 FK | 1.6 | 34.4 | | 10.0 | 28.0 | 20.7 | | |

TABLE 3

| Formulation No. | Starch (Gum 270) | Resin 1 (SMA) | Resin 2 (Unicrepe) | Ammonia | Pigment (Jetcoat 20) | Solids (%) | Tinopal | pH |
|---|---|---|---|---|---|---|---|---|
| 94-2 | 24.6 | 3.0 | 3.0 | | 69.4 | 19.2 | | |
| 94-3 | 18.6 | 3.0 | 9.0 | trace | 69.4 | 18.9 | | |
| 94-4 | 27.8 | 3.0 | 3.0 | trace | 66.2 | 18.7 | | |
| 94-5 | 27.8 | 3.0 | 9.0 | trace | 60.2 | 18.6 | | |
| 94-6 | 27.8 | 1.0 | 6.0 | trace | 65.2 | 17.0 | | |
| 94-7 | 20.0 | 5.0 | 5.0 | | 68.0 | 15.3 | 2.0 | |
| 94-8 | 20.0 | 5.0 | 15.0 | trace | 58.0 | 15.5 | 2.0 | |

TABLE 4

| Formulation No. | Starch (Gum 280) | Resin 1 (Carboset) | Resin 2 (EPEI) | Zr | Pigment (Jetcoat 20) |
|---|---|---|---|---|---|
| 31-1 | 18.6 | 3 | 9 | | 69.4 |
| 32-1 | 18.6 | 3 | 9 | 4.4 | 65 |

TABLE 5

| Component | Formulation No. 94-2 | Formulation No. 94-5 | Formulation No. 94-6 |
|---|---|---|---|
| SMA:Unicrepe Ratio | 1:1 | 1:3 | 1:6 |
| SMA | 3.0 | 3.0 | 1.0 |
| Unicrepe | 3.0 | 9.0 | 6.0 |
| Ammonia | 0.0 | trace | trace |
| Starch (Gum 270) | 24.6 | 27.8 | 27.8 |
| Pigment (Jetcoat 20) | 69.4 | 60.2 | 65.2 |
| Water, mL | 0.0 | 1.0 | 7.0 |
| % Solid | 19.2 | 18.6 | 17.0 |

Each of the representative formulations set forth in Tables 1 through 5 was effective to produce a coated paper substrate and a sized paper substrate having the beneficial features described herein, i.e., with respect to bleeding, wicking and water-fastness of an image printed on the paper surface using a water-based inkjet ink and an inkjet printer. The formulations were also evaluated on (1) aluminum foil and other metal foil sheets, (2) cotton and cotton/polyester blend textile materials, (3) resin-coated paper (i.e., PVC-coated paper), and (4) latex-saturated paper. Each of the aforementioned substrates was coated with a formulation set forth in Tables 1 through 5 using a knife, a Meyer rod, or rollers, to achieve a coating thickness in the range of about 2 g/m² to 30 g/m². After coating and drying, the treated substrates were printed on using a water-based inkjet ink. The printed images were found to be water-fast as well as bleed-resistant and rub-resistant, and of superior quality with respect to both optical density and brightness.

What is claimed is:

1. A process for treating a solid substrate to enhance the quality of images printed thereon, comprising applying an image-enhancing agent present in an image-enhancing composition to the surface of a substrate comprised of a metal, an inorganic oxide or a laminate, wherein the image-enhancing agent comprises a mixture of a polyacid and a polybase and the image-enhancing composition optionally includes up to 40 wt. % of a film-forming binder, wherein the polyacid contains two or more carboxylic, sulfonic and/or phosphonic acid groups and the polybase contains two or more primary, secondary or tertiary amine groups.

2. The process of claim 1, wherein the polyacid contains two or more carboxylic, sulfonic and/or phosphonic acid groups and the polybase contains two or more primary, secondary or tertiary amine groups.

3. The process of claim 1, wherein the polyacid and polybase are monomeric.

4. The process of claim 3, wherein the monomeric polyacid has the structural formula

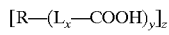

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;
L is an alkylene or alkenylene chain containing 1 to 8 carbon atoms;
x is 0 or 1;
y is an integer in the range of 2 to 10 inclusive; and
z is 1, 2 or 3,
with the proviso that if z is 2 or 3, the distinct R groups are covalently linked to each other, and the monomeric polybase has the structural formula

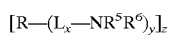

wherein $R^5$ and $R^6$ are hydrogen, alkyl, alkoxy, or hydroxyl-substituted alkoxy, and R, L, x, y and z are as defined with respect to the monomeric polyacid.

5. The process of claim 4, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

6. The process of claim 4, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamnine, 4,4'-bipyridyl, and combinations thereof.

7. The process of claim 5, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

8. The process of claim 1, wherein the polyacid and polybase are polymeric.

9. The process of claim 8, wherein the polymeric polyacid is a carboxylic acid-containing polymer and the polymeric polybase comprises a nitrogenous polymer.

10. The process of claim 9, wherein the polymeric polyacid is selected from the group consisting of poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(ethylene-propylene-acrylic acid), poly(propylene-acrylic acid), alginic acid, phytic acid, and combinations thereof, and the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

11. The process of claim 1, wherein the polyacid is monomeric and the polybase is polymeric.

12. The process of claim 11, wherein the monomeric polyacid has the structural formula

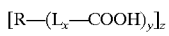

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;
L is an alkylene or alkenylene chain containing 1 to 8 carbon atoms;
x is 0 or 1;
y is an integer in the range of 2 to 10 inclusive; and
z is 1,2 or 3,
with the proviso that if z is 2 or 3, the distinct R groups are covalently linked to each other, and the polymeric polybase comprises a nitrogenous polymer.

13. The process of claim 12, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof, and the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

14. The process of claim 1, wherein the polyacid is polymeric and the polybase is monomeric.

15. The process of claim 14, wherein the polymeric polyacid is a carboxylic acid-containing polymer, and the monomeric polybase has the structural formula $$[R-(L_x-NR^5R^6)_y]_z$$

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;
L is an alkylene or alkenylene chain containing 1 to 8 carbon atoms;
x is 0 or 1;
y is an integer in the range of 2 to 10 inclusive;
z is 1, 2 or 3; and
$R^5$ and $R^6$ are hydrogen, alkyl, alkoxy, or hydroxyl-substituted alkoxy,
with the proviso that if z is 2 or 3, the distinct R groups are covalently linked to each other.

16. The process of claim 15, wherein the polymeric polyacid is selected from the group consisting of poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(ethylene-propylene-acrylic acid), poly(propylene-acrylic acid), alginic acid, phytic acid, and combinations thereof, and the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

17. The process of claim 1, wherein the image-enhancing composition is aqueous.

18. The process of claim 1, wherein the image enhancing composition includes a film-forming binder.

19. The process of claim 18, wherein the film-forming binder is selected from the group consisting of polysaccharides, polypeptides, synthetic vinyl polymers, and derivatives thereof.

20. The process of claim 19, wherein the film-forming binder is a polysaccharide or a derivative thereof.

21. The process of claim 20, wherein the polysaccharide is starch.

22. The process of claim 20, wherein the polysaccharide is a cellulosic polymer.

23. The process of claim 20, wherein the polysaccharide is dextran.

24. The process of claim 19, wherein the film-forming binder is a polypeptide.

25. The process of claim 24, wherein the polypeptide is selected from the group consisting of collagen and gelatin.

26. The process of claim 19, wherein the film-forming binder is a synthetic vinyl polymer.

27. The process of claim 26, wherein the synthetic vinyl polymer is selected from the group consisting of poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinylamine).

28. The process of claim 27, wherein the synthetic vinyl polymer is a vinyl pyrrolidone-styrene copolymer.

29. The process of claim 1, wherein the image-enhancing composition further includes a colorant.

30. The process of claim 29, wherein the colorant is a pigment.

31. The process of claim 30, wherein the pigment is selected from the group consisting of silica, titanium dioxide and calcium carbonate.

32. The process of claim 29, wherein the colorant is a dye.

33. The process of claim 1, wherein the image-enhancing agent represents approximately 5 wt. % to 95 wt. % of the image-enhancing composition, based upon total solids weight of the composition after drying.

34. The process of claim 1, wherein the film-forming binder represents approximately 1 wt. % to 40 wt. % of the image-enhancing composition.

35. The process of claim 34, wherein the film-forming binder represents approximately 1 wt. % to 25 wt. % of the image-enhancing composition.

36. The process of claim 35, wherein the film-forming binder represents approximately 1 wt. % to 15 wt. % of the image-enhancing composition.

37. The process of claim 1, wherein the substrate is metallic.

38. The process of claim 1, wherein the substrate is comprised of an inorganic oxide.

39. The process of claim 1, wherein the substrate is a laminate.

40. A solid substrate having a surface treated with an image-enhancing composition comprised of an image-enhancing agent comprised of a mixture of a polyacid and a polybase, wherein the substrate is comprised of a metal, an inorganic oxide, or a laminate, and further wherein the polyacid contains two or more carboxylic, sulfonic and/or phosphonic acid groups and the polybase contains two or more primary secondary or tertiary amine groups.

41. The treated substrate of claim 40, wherein the image-enhancing composition is present as a coating on the substrate.

42. The treated substrate of claim 40, wherein the substrate is infiltrated with the image-enhancing composition.

43. The treated substrate of claim 41, wherein the image-enhancing composition is also present within the substrate.

44. The treated substrate of claim 40, wherein the substrate is metallic.

45. The treated substrate of claim 40, wherein the substrate is comprised of an inorganic oxide.

46. The treated substrate of claim 40, wherein the substrate is comprised of a laminate.

47. A method for providing a water-resistant image on a substrate, comprising:
applying an image-enhancing agent in an image-enhancing composition to the surface of a substrate comprised of a metal, an inorganic oxide, or a laminate, said image-enhancing agent comprising a mixture of a polyacid and a polybase, wherein the polyacid contains two or more carboxylic, sulfonic and/or phosphonic acid groups and the polybase contains two or more primary, secondary or tertiary amine groups, to provide a treated substrate; and applying a dye composition to the treated substrate, wherein the dye composition contains a reactive dye having ionizable and/or nucleophilic groups capable of reacting with the image-enhancing agent.

48. A printed substrate prepared by the method of claim 47.

49. The method of claim 47, wherein the substrate is metallic.

50. The method of claim 47, wherein the substrate is comprised of an inorganic oxide.

51. The method of claim 47, wherein the substrate is a laminate.

* * * * *